No. 800,325. PATENTED SEPT. 26, 1905.
H. SCHIELKE.
SHOW CASE.
APPLICATION FILED JULY 2, 1904.
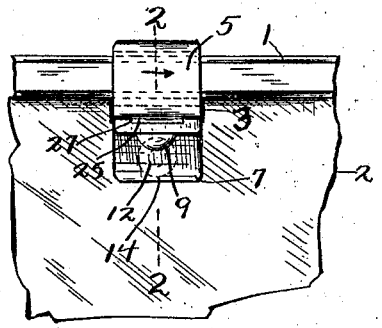
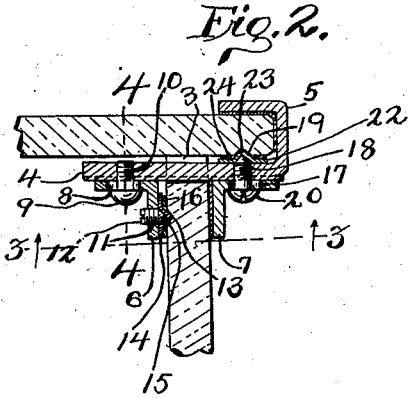
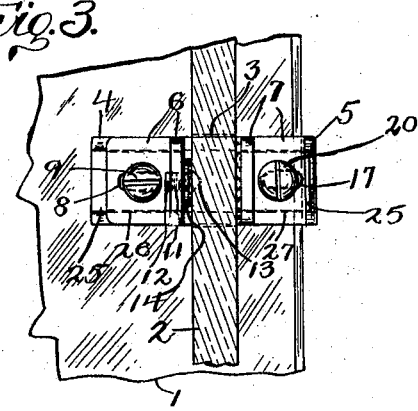
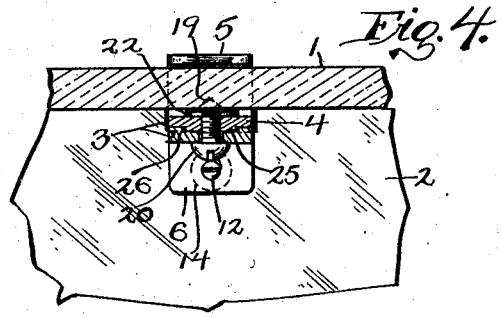
WITNESSES:
Daniel E. Daly.
Victor C. Lynch.
INVENTOR
Herman Schielke
BY
Lynch & Dorer
his ATTORNEYS.

UNITED STATES PATENT OFFICE.

HERMAN SCHIELKE, OF CLEVELAND, OHIO.

SHOW-CASE.

No. 800,325. Specification of Letters Patent. Patented Sept. 26, 1905.

Application filed July 2, 1904. Serial No. 215,119.

*To all whom it may concern:*

Be it known that I, HERMAN SCHIELKE, a citizen of the United States of America, residing at Cleveland, in the county of Cuyahoga and State of Ohio, have invented certain new and useful Improvements in Show-Cases; and I hereby declare the following to be a full, clear, and exact description of the invention, such as will enable others skilled in the art to which it pertains to make and use the same.

This invention relates to improvements in show-cases.

The object of this invention is to provide improved means for securing together the glass plates constituting an all-glass show-case.

The invention therefore consists in providing an adjustable clamping device for securing the top plate of a show-case to the side plates, so as to allow the top plate to project beyond the side plates a greater or less distance, as desired.

The invention also consists in the features of construction and combination of parts as described in the specification, pointed out in the claims, and illustrated in the drawings.

In the accompanying drawings, Figure 1 is a view of a section of a show-case, showing a top plate and side plate secured together by a device embodying the invention, the said device being shown in elevation. Fig. 2 is a section on line 2 2, Fig. 1. Fig. 3 is a section on line 3 3, Fig. 2. Fig. 4 is a section on line 4 4, Fig. 2.

Again referring to the drawings, 1 represents the top plate of a glass show-case which is generally arranged in a horizontal plane, and 2 represents a side plate which is generally arranged in a vertical plane, so as to form a right angle with the top plate. In the plate 2 is formed a notch or recess 3. The device for securing the plates together comprises a member 4, preferably formed of sheet metal, on the upper side of which is arranged a stationary jaw 5, which is preferably formed integral with said plate 4 and coöperates with said plate to form a clamp which embraces the edge of the top plate. On the under side of said member 4 are arranged two movable jaws 6 and 7, which form a clamp for embracing the top edge and sides of the plate 2. The jaws 6 and 7 are preferably formed of angle-iron. In the jaw 6 is formed an oblong opening 8, through which a screw 9 is passed, which enters a screw-hole 10 in the member 4, so as to adjustably secure said jaw 6 to said member 4. A screw-hole 11 is formed in said jaw 6, and through this hole 11 is passed a screw 12, which enters a depression 13, formed in the plate 2, and is designed to clamp the plate between said jaws after they have been adjusted at each side thereof. A guard-disk 14, having a projection 15, which fits into the depression in the plate 2, is preferably arranged between the end of the screw 12 and the plate 2. A rubber washer 16 is arranged between the guard-disk 14 and the glass plate 2. In the jaw 7 is formed an oblong opening 17, and in the member 4 is formed a screw-hole 18. A depression 19 is formed in the top plate 1 in line with said screw-hole 18, and a screw 20 is passed through the holes 17 and 18 and enters the depression 19, thereby adjustably securing the jaw 7 to the member 4 and securing the member 4 to said plate 1. A guard-disk 22, having a projection 23, and a washer 24, similar to the guard-disk 14 and washer 16, are arranged between the plate 1 and the end of the screw 20. On the bottom of the member 4 is formed a ridge 25, and in the jaws 6 and 7 are formed grooves 26 and 27, respectively, which allow them to straddle the said ridge 25, and this arrangement prevents sidewise displacement or movement of the said jaws.

When using my improved device, the glass plates are first assembled with the top plate resting on the side plate and projecting beyond the outer face of the side plate the preferred distance. The jaw 6 is preferably removed from the member 4, and the member 4 is inserted in the notch 3 in the plate 2, so that it extends along the under side of the plate 1, and the stationary jaw rests on the top edge thereof. The jaw 7 is then moved close against the outer face of the plate 2, and the screw 20 is tightened so as to secure the said jaw rigidly to the member 4 and also lock the said member on the edge of the plate 1. The jaw 6 is placed close against the inner face of plate 2 and is rigidly secured to the member 4 by the screw 9, and the screw 12 is screwed in so as to securely clamp the plate 2 between the jaws 6 and 7.

What I claim is—

1. In a show-case, the combination with the top glass plate and side glass plate of a device for securing said plates together, comprising a member arranged to extend in under the top plate and provided with a jaw arranged to coöperate with said member to form a clamp for engaging the top plate and provided with two jaws arranged to form a clamp for engaging the side plate, substantially as described and for the purpose set forth.

2. In a show-case, the combination with the top glass plate and the side glass plate of a device for securing the said plates together, comprising a member having a fixed jaw arranged to coöperate with the said member to form a clamp for engaging the top plate and two jaws arranged to form a clamp for engaging the side plate and means for adjusting said last-mentioned jaws on said member, for the purpose set forth.

3. In a show-case, the combination with the top glass plate and the side glass plate of a device for securing the said plates together, comprising a member arranged to extend in under the top plate and provided with a jaw arranged to coöperate with said member to form a clamp for engaging the top plate and provided with two jaws arranged to form a clamp for engaging the side plate and means for securing said jaws to said plates, substantially as described and for the purpose set forth.

4. In a show-case, the combination with the top plate and the side plate of a device, for securing said plates together, comprising a member arranged to extend in under the top plate and provided with a jaw arranged to coöperate with said member to form a clamp for engaging the top plate and a screw for securing the top plate between said jaw and said member and provided with two jaws arranged to form a clamp for engaging the side plate and a screw for securing said side plate between said jaws.

5. In a show-case, the combination with the top plate and the side plate of a device, for securing said plates together, comprising a member arranged to extend in under the top plate and provided with a jaw arranged to coöperate with said member to form a clamp for engaging the top plate, a screw for securing the top plate between said jaw and said member and a washer arranged between the end of said screw and said plate, and provided with two jaws arranged to form a clamp for engaging the side plate, a screw for securing the side plate between said jaws and a washer arranged between the end of the screw and said plate.

6. In a show-case, the combination with the top plate and the side plate of a device, for securing said plates together, comprising a member provided with jaws arranged to form two separate clamps one of which engages the top plate and the other of which engages the side plate, screws for holding the plates in the respective clamps, metallic guards arranged over the ends of said screws and washers arranged between the metallic guards and the plates substantially as described and for the purpose set forth.

7. In a show-case, the combination with a top plate having a depression formed therein and a side plate having a depression formed therein, of a device for securing said plates together comprising a member provided with jaws arranged to form two separate clamps, one of which engages the top plate and the other of which engages the side plate, screws for holding the plates in the respective clamps, metallic guards arranged over the ends of said screws and provided with projections arranged to extend into the depressions in said plates and washers arranged between said metallic guards and said plates, substantially as described and for the purpose set forth.

In testimony whereof I sign the foregoing specification in the presence of two witnesses.

HERMAN SCHIELKE.

Witnesses:
 VICTOR C. LYNCH,
 G. M. HAYES.